(12) United States Patent
Lee et al.

(10) Patent No.: US 8,611,462 B2
(45) Date of Patent: Dec. 17, 2013

(54) DATA TRANSFER METHOD USING PHASE-SHIFT BASED PRECODING AND TRANSMITTER IMPLEMENTING THE SAME

(75) Inventors: Moon Il Lee, Anyang-si (KR); Bin Chul Ihm, Anyang-si (KR); Jin Young Chun, Anyang-si (KR); Jae Won Jang, Anyang-si (KR); Jin Hyuk Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1055 days.

(21) Appl. No.: 12/306,097

(22) PCT Filed: Jun. 22, 2007

(86) PCT No.: PCT/KR2007/003040
§ 371 (c)(1),
(2), (4) Date: Oct. 30, 2009

(87) PCT Pub. No.: WO2007/148943
PCT Pub. Date: Dec. 27, 2007

(65) Prior Publication Data
US 2010/0061477 A1    Mar. 11, 2010

Related U.S. Application Data

(60) Provisional application No. 60/805,562, filed on Jun. 22, 2006, provisional application No. 60/862,567, filed on Oct. 23, 2006.

(30) Foreign Application Priority Data

Sep. 7, 2006  (KR) .................. 10-2006-0086138
Jan. 22, 2007  (KR) .................. 10-2007-0006691

(51) Int. Cl.
*H04L 27/00*    (2006.01)

(52) U.S. Cl.
USPC ........................................ 375/299

(58) Field of Classification Search
USPC .................... 375/259, 260, 295, 299, 316
See application file for complete search history.

(56) References Cited

U.S. PATENT DOCUMENTS

| | | |
|---|---|---|
| 2003/0072380 A1 | 4/2003 | Huang |
| 2006/0030364 A1 | 2/2006 | Olesen et al. |
| 2006/0146692 A1* | 7/2006 | Gorokhov et al. ............ 370/208 |
| 2007/0097856 A1* | 5/2007 | Wang et al. .................... 370/210 |

FOREIGN PATENT DOCUMENTS

| | | |
|---|---|---|
| EP | 0806852 | 11/1997 |
| WO | 00/13314 | 3/2000 |
| WO | 01/89030 | 11/2001 |

* cited by examiner

*Primary Examiner* — Kevin M Burd
(74) *Attorney, Agent, or Firm* — Lee, Hong, Degerman, Kang & Waimey

(57) ABSTRACT

A method of transmitting data using phase-shift-based precoding in a multiple antenna system using a plurality of subcarriers is disclosed. More specifically, the method includes determining a phase-shift-based precoding matrix for transmitting the data by adjusting a transmission phase angle for each antenna, applying an offset for applying offset information fed back from a receiving terminal to the determined precoding matrix, and performing precoding by multiplying the offset applied precoding matrix by a symbol of each subcarrier.

10 Claims, 13 Drawing Sheets

DATA TRANSFER METHOD USING PHASE-SHIFT BASED PRECODING AND TRANSMITTER IMPLEMENTING THE SAME

CROSS-REFERENCE TO RELATED APPLICATIONS

This application is the National Stage filing under 35 U.S.C. 371 of International Application No. PCT/KR2007/003040, filed on Jun. 22, 2007, which claims the benefit of earlier filing date and right of priority to Korean Application Nos. 10-2006-0086138, filed on Sep. 7, 2006, and 10-2007-0006691, filed on Jan. 22, 2007, and also claims the benefit of U.S. Provisional Application Ser. Nos. 60/805,562, filed on Jun. 22, 2006, and 60/862,567, filed on Oct. 23, 2006.

TECHNICAL FIELD

The present invention relates to a phase-shift based precoding method in a multiple antenna system using a plurality of subcarriers, and more particularly, to a data transfer method using phase shift-based precoding and transmitter implementing the same. Although the present invention is suitable for a wide scope of applications, it is particularly suitable for performing communication in an optimal channel status by considering information feedback from a receiving terminal.

BACKGROUND ART

Recently, the generalization of information communication services, the advent of various multimedia services and the appearance of high-quality services rapidly raise the demand for wireless communication services. To actively cope with the demand, a capacity of a communication system should be increased.

In order to increase the communication capacity in a wireless communication environment, two options can be explored, namely, a method of finding a new available frequency band, and a method of raising efficiency of given resources.

With respect to the latter method, many attentions are paid to the multiple antenna transceiving technologies for enhancing transmission capacity in a manner of obtaining a diversity gain by securing a special area for resource utilization using a plurality of antennas provided to a transceiver or transmitting data in parallel via the respective antennas. Moreover, many efforts are actively made to research and develop the multiple antenna transceiving technologies.

DISCLOSURE OF THE INVENTION

Technical Problem

However, although many attentions are paid to the above-explained phase shift diversity scheme advantageous in obtaining a frequency selective diversity gain in an open loop and a frequency scheduling gain in a closed loop as well, the phase shift diversity scheme has a spatial multiplexing rate of 1 to fail to provide a high data rate. In case that resource allocation is fixed, it is difficult to obtain the above-explained gains.

Moreover, although the above-explained codebook-based precoding scheme is advantageous in enabling effective data transmission by using a high spatial multiplexing rate with a requirement for small-sized feedback information (index information), a stable channel should be secured for feedback. Hence, the codebook-based precoding scheme is not suitable for a mobile environment having considerable channel variation but applicable to a closed-loop system only.

Technical Solution

Accordingly, the present invention is directed to a data transfer method using phase-shift-based precoding and transmitter implementing the same that substantially obviate one or more of the problems due to limitations and disadvantages of the related art.

An object of the present invention is to provide a method of transmitting data using phase shift-based precoding in a multiple antenna system using a plurality of subcarriers.

Another object of the present invention is to provide transmitter for performing phase-shift-based precoding in a multiple antenna system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting data using phase-shift based precoding in a multiple antenna system using a plurality of subcarriers include determining a phase-shift-based precoding matrix for transmitting the data by adjusting a transmission phase angle for each antenna, applying an offset for applying offset information fed back from a receiving terminal to the determined precoding matrix, and performing precoding by multiplying the offset applied precoding matrix by a symbol of each subcarrier.

In another aspect of the present invention, a transmitter for performing phase-shift based precoding in a multiple antenna system includes a precoding matrix determination module determining a phase-shift-based precoding matrix for transmitting the data by adjusting a transmission phase angle for each antenna, an offset application module applying an offset for applying offset information fed back from a receiving terminal to the determined precoding matrix, and a precoding module performing precoding by multiplying the offset applied precoding matrix by a symbol of each subcarrier.

It is to be understood that both the foregoing general description and the following detailed description are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

Figure 1:
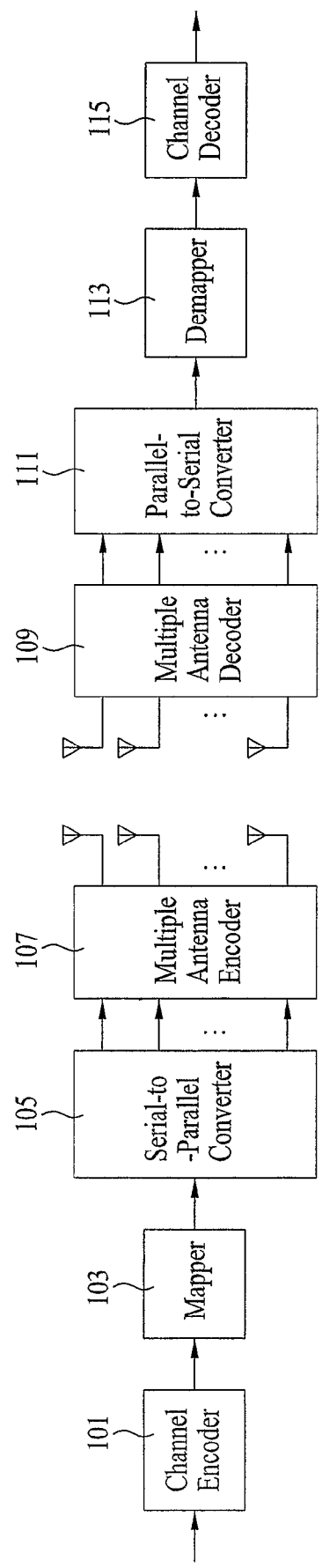
FIG. 1 is an exemplary block diagram illustrating configuration of a MIMO system.

A configuration of an MIMO (multi-input multi-output) system, which uses orthogonal frequency division multiplexing (OFDM) of the multiple antenna transceiving technologies, is explained with reference to FIG. 1 as follows. FIG. 1 is an exemplary block diagram illustrating configuration of a MIMO system.

In a transmitting terminal, a channel encoder 101 is configured to reduce channel or noise effects by attaching redundant bit to transmission data bits. A mapper 103 is configured to transform data bit information into data symbol information. A serial-to-parallel converter 103 is configured to allocate data symbols to a plurality of subcarriers. A multiple antenna encoder 107 is configured to transform the data symbols into a time-space signal.

In a receiving terminal, a multiple antenna decoder 109, a parallel-to-serial converter 111, a demapper 113 and a channel decoder 115 carry out reverse functions of the multiple antenna encoder 109, the serial-to-parallel converter 105, the mapper 103 and the channel encoder 101 in the transmitting terminal, respectively.

For the multiple antenna OFDM system, various techniques (or schemes) for enhancing data transfer reliability are required. The schemes for raising a spatial diversity gain include STC (space-time code), CDD (cyclic delay diversity), and the like. The schemes for raising SNR (signal-to-noise ratio) include BF (beam forming) and precoding.

Here, the STC or CDD is mainly used to improve transmission reliability of an open-loop system. In the open-loop system, the transmitting terminal is unable to use feedback information. Furthermore, the beam forming or the precoding is used to maximize the SNR via feedback information in a closed-loop system. In the closed-loop system, the transmitting terminal is able use the feedback information.

Out of the aforementioned schemes (or techniques), the CDD and the precoding schemes will be further described as the techniques for increasing the spatial diversity gain and for increasing the SNR.

In the CDD scheme, the OFDM signal can be transmitted in a system having a plurality of antennas. Here, each antenna can transmit a signal with a different delay or size to enable the receiving terminal to achieve frequency diversity gain.

Figure 2:
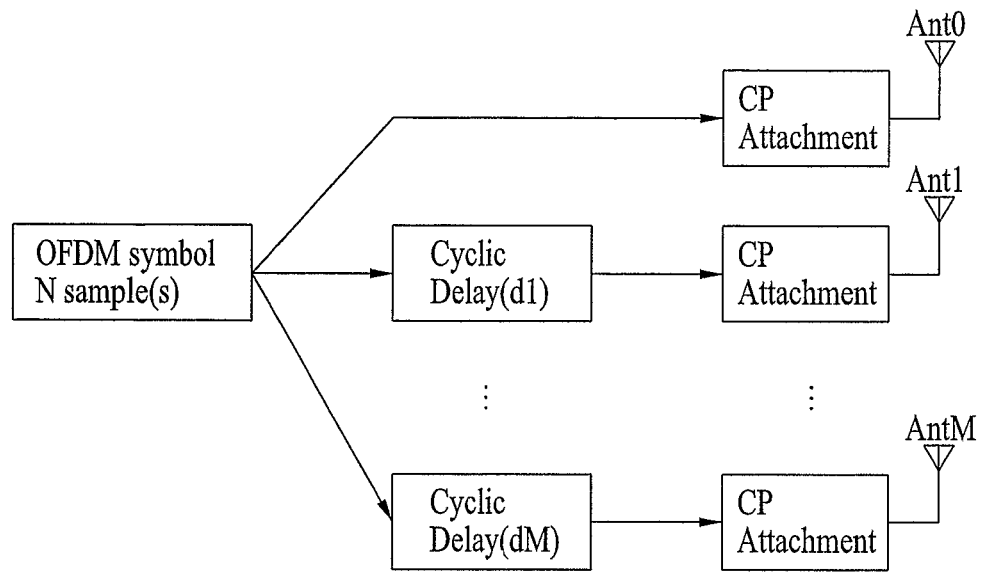
FIG. 2 is an exemplary diagram illustrating a configuration of a transmitting terminal in a multiple antenna system using cyclic delay diversity scheme.

FIG. 2 is an exemplary diagram illustrating a configuration of a transmitting terminal in a multiple antenna system using cyclic delay diversity scheme.

OFDM symbol can be separately delivered to each antenna via a serial-to-parallel converter and a multiple antenna encoder. A cyclic prefix (CP) for preventing inter-channel interference can be attached to the delivered symbol and then transmitted to a receiving terminal.

In this case, a data sequence delivered to a first antenna is transmitted to the receiving terminal without delay. However, data sequence delivered to a next-ordered (or subsequent) antenna is transmitted to the receiving terminal by being cyclically delayed by predetermined bits following a previous-ordered antenna.

Figure 3:
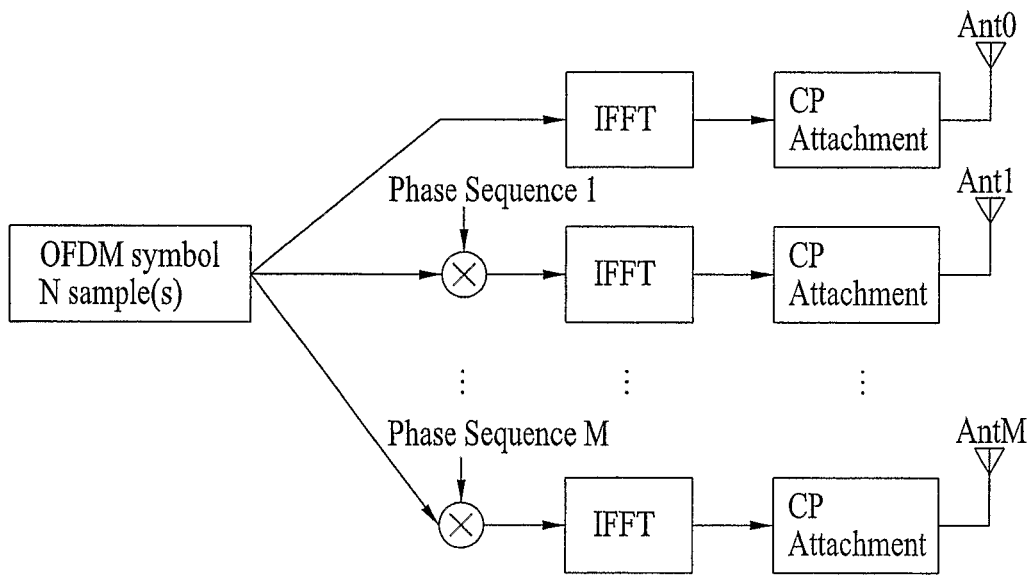
FIG. 3 is a diagram of a transmitting terminal of a multiple antenna system using phase shift diversity scheme.

If the cyclic delay diversity scheme is implemented in a frequency domain, the cyclic delay can be represented as a multiplication of phase sequence. In particular, referring to FIG. 3, which is a diagram of a transmitting terminal of a multiple antenna system using phase shift diversity scheme, after each data sequence in a frequency domain has been multiplied by a prescribed phase sequence (phase sequence 1~phase sequence M) set different per antenna, fast inverse Fourier transform (IFFT) can be applied to a result of the multiplication to be transmitted to a receiving terminal. This is called a phase shift diversity scheme.

According to the phase shift diversity scheme, a flat fading channel can be changed (or modified) into a frequency selective channel. Moreover, through channel encoding, a frequency diversity gain or a frequency scheduling gain can be achieved.

Figure 4:
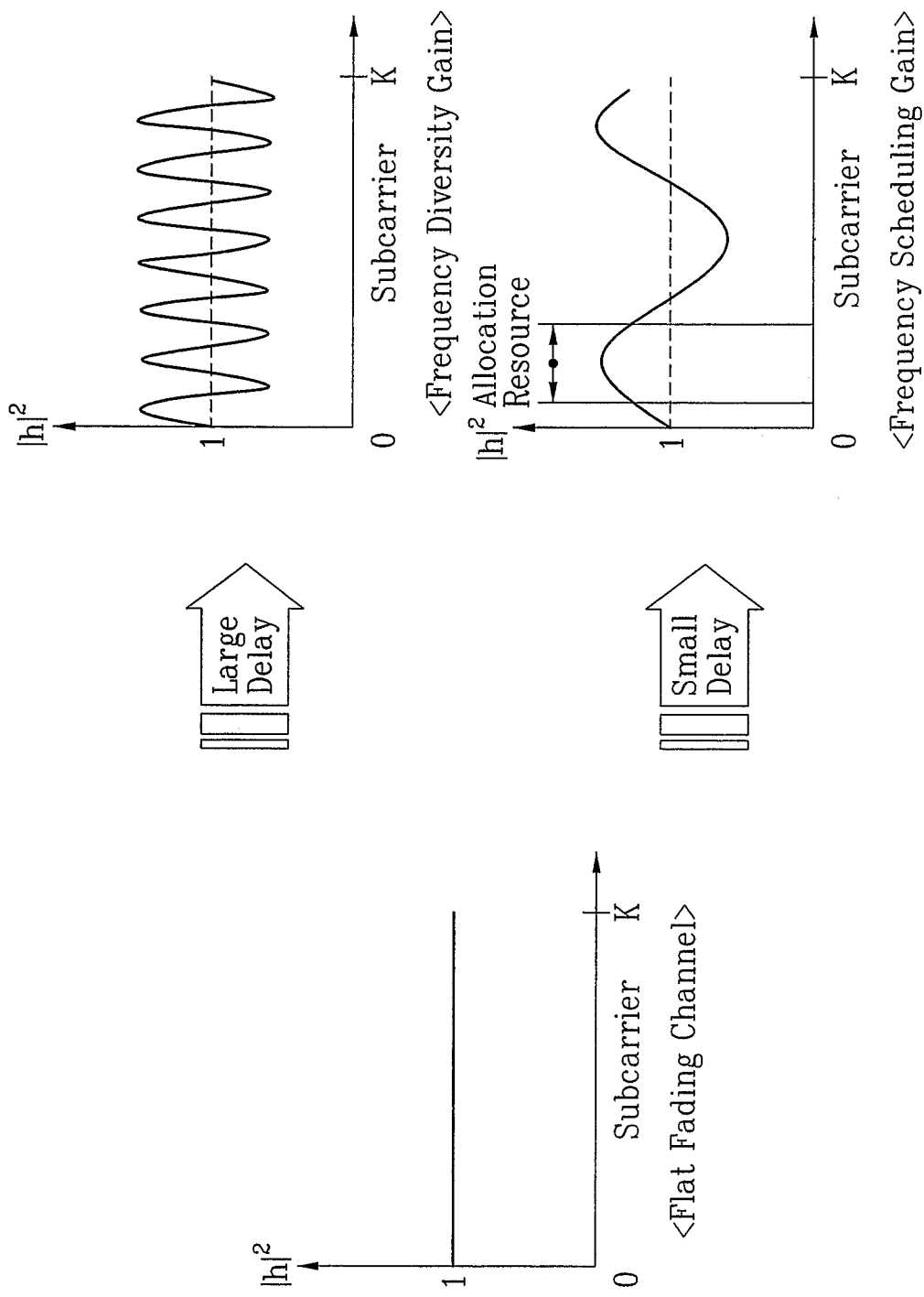
FIG. 4 is a graph of two application examples of phase shift diversity scheme.

Further, referring to FIG. 4, which is a graph of two application examples of phase shift diversity scheme, if a cyclic delay having a large value is used, frequency selectivity is increased since the frequency selective cycle is shortened. Consequently, the channel code can more efficiently exploit frequency diversity gain. This is mainly used for an open-loop system having low reliability of feedback information due to considerable temporal variation of a channel.

Similarly, if a cyclic delay having a small value is used, a low frequency variation in frequency domain is introduced. Hence, a closed-loop system can use the low frequency selective cycle to allocate resources to an area having the best channel condition. Consequently, a frequency scheduling gain can be achieved. That is, in applying the phase shift diversity scheme, if a phase sequence is generated using a cyclic prefix having a small value, a channel-size increasing part and channel-size decreasing part, as shown in FIG. 4, exist in a frequency selective channel changed from a flat fading channel. Hence, a channel size increases in a predetermined subcarrier area of OFDM signal and decreases in other subcarrier areas.

In the OFDMA system accommodating a plurality of users, if a signal is transmitted for each of the users via a predetermined frequency band having an increased channel size, the SNR can be increased. Moreover, since the frequency bandwidth having increased channel size per user can be different (or vary), the system can achieve scheduling gain for a plurality of users. Furthermore, since the receiving terminal only transmits CQI (channel quality indicator) information as feedback information, it the size of the feedback information according to this scheme can become smaller than that of another schemes. Here, the CQI includes information related to a subcarrier area enabling resource allocation.

Meanwhile, the precoding scheme can be categorized into a codebook-based precoding scheme and a feedback scheme. The codebook-based scheme can be used if the feedback information is finite in a closed-loop system. The feedback scheme can be used to feed back (as feedback information) quantized channel information. In particular, the codebook-based precoding scheme can be used to achieve the SNR gain by feeding back an index of precoding matrix, which is already known by both transmitting and receiving terminals, to the transmitting terminal.

Figure 5:
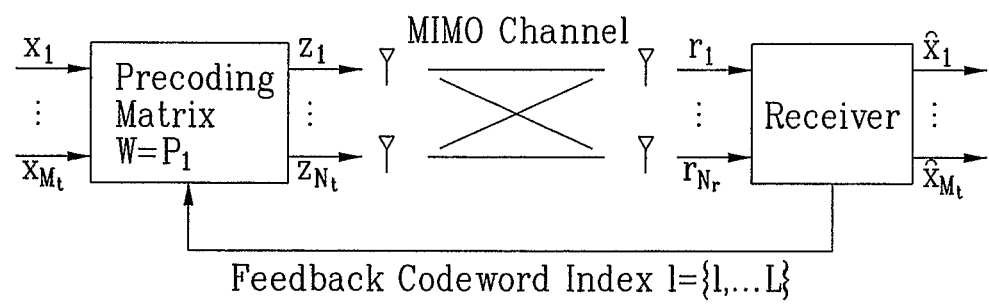
FIG. 5 is an exemplary diagram illustrating a configuration of transmitting and receiving terminals in a multiple antenna system using the codebook-based precoding scheme.

FIG. 5 is an exemplary diagram illustrating a configuration of transmitting and receiving terminals in a multiple antenna system using the codebook-based precoding scheme.

Referring to FIG. 5, each of the transmitting and receiving terminals has finite precoding matrix $P_1 \sim P_L$. The receiving terminal feeds back an optimal precoding matrix index (1) to the transmitting terminal using channel information. The transmitting terminal then applies a precoding matrix corresponding to the feedback index (or an index which has been fed back) to transmission data $x_1 \sim x_{M(t)}$. For reference, Table 1 shows an example of a codebook applicable where IEEE 802.16e system, which has two transmitting antennas and supports a spatial multiplexing rate 2, uses 3-bit feedback information.

TABLE 1

| Matrix index (binary) | Column1 | Column2 |
|---|---|---|
| 000 | 1 | 0 |
|  | 0 | 1 |
| 001 | 0.7940 | −0.5801 − j0.1818 |
|  | −0.5801 + j0.1818 | −0.7940 |
| 010 | 0.7940 | 0.0576 − j0.5051 |
|  | 0.0576 + j0.5051 | −0.7940 |
| 011 | 0.7941 | −0.2978 + j0.5298 |
|  | −0.2978 − j0.5298 | −0.7941 |
| 100 | 0.7941 | 0.6038 − j0.0689 |
|  | 0.6038 + j0.0689 | −0.7941 |
| 101 | 0.3289 | 0.6614 − j0.6740 |
|  | 0.6614 + j0.6740 | −0.3289 |
| 110 | 0.5112 | 0.4754 + j0.7160 |
|  | 0.4754 − j0.7160 | −0.5112 |
| 111 | 0.3289 | −0.8779 + j0.3481 |
|  | −0.8779 − j0.3481 | −0.3289 |

Figure 6:
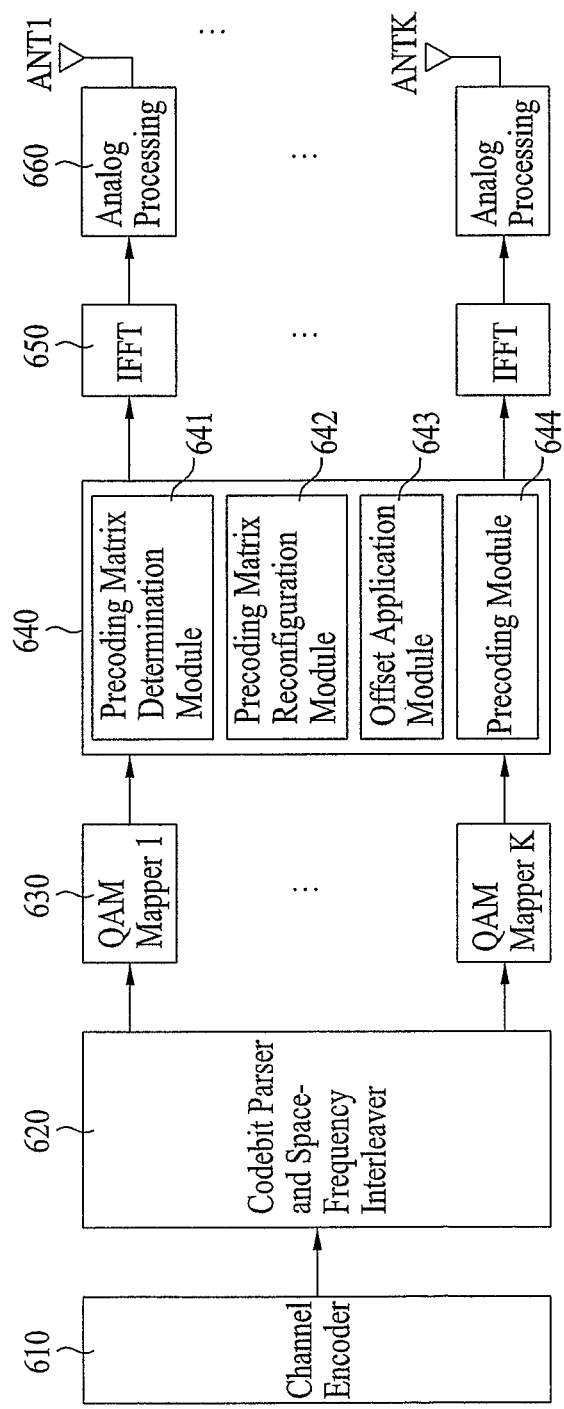
FIG. 6 is an exemplary block diagram illustrating of a single codeword (SCW) OFDM transmitter having phase-shift based precoding scheme applied thereto.
Figure 7:
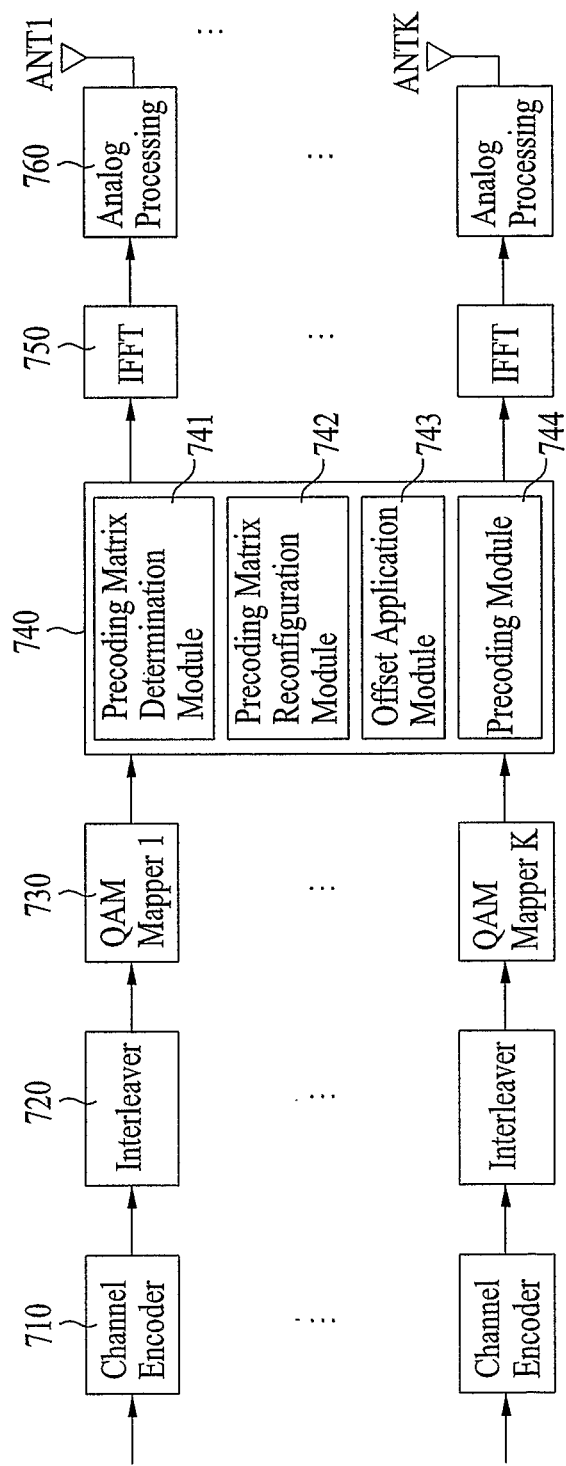
FIG. 7 is an exemplary block diagram illustrating multi codeword (MCW) OFDM transmitter having phase-shift-based precoding scheme applied thereto.

FIG. 6 is an exemplary block diagram illustrating of a single codeword (SCW) OFDM transmitter having phase-shift-based precoding scheme applied thereto. FIG. 7 is an exemplary block diagram illustrating multi codeword (MCW) OFDM transmitter having phase-shift based precoding scheme applied thereto.

Referring to FIG. 6 and FIG. 7, a channel encoder 610 adds redundancy bits to prevent transmission data from being distorted in a channel and performs channel encoding using encryption code such as turbo code, LDPC code, and a like.

An interleaver 620 performs interleaving through code bit parsing to minimize a loss caused by an instant noise in the course of data transmission. A mapper 630 then transforms the interleaved data bits into OFDM symbol. This symbol mapping can be carried out by phase modulating schemes such as a quadrature phase shift keying (QPSK) or quadrature amplitude modulation (QAM) (e.g., 16QAM, 8QAM, and 4QAM).

Thereafter, the OFDM symbol passes through a precoder 640 is carried on subcarrier(s) in a time domain via a subchannel modulator (not shown in the drawings) and an inverse fast Fourier transformer (IFFT) 650, and is then transmitted on a radio channel via a filter (not shown in the drawings) and an analog converter 660. Details of the precoder 640 will be explained later.

With respect to the configurations of FIG. 7, the MCW OFDM transmitter has almost the same configuration (730~760) to those of the SCW OFDM transmitter but differs in that the OFDM symbol passes through a channel encoder 710 and an interleaver 720 by being paralleled per channel.

Precoding matrix generation, reconfiguration, and offset application can be performed by a precoding matrix determination module 641/741, a precoding matrix reconfiguration module 642/742 and an offset application module 643/743, respectively are confirmed though Formulas in the following description.

Generation of Phase-shift Based Precoding Matrix

A phase-shift-based precoding matrix, P, can be represented as follows.

$$P^k_{N_t \times R} = \begin{bmatrix} w^k_{1,1} & w^k_{1,2} & \cdots & w^k_{1,R} \\ w^k_{2,1} & w^k_{2,1} & \cdots & w^k_{2,1} \\ \vdots & \vdots & \ddots & \vdots \\ w^k_{N_t,1} & w^k_{N_t,2} & \cdots & w^k_{N_t,R} \end{bmatrix} \quad \text{[Formula 1]}$$

In Formula 1, $w_{i,j}{}^k$ (i=1, . . . , $N_t$, j=1, . . . , R) denotes a complex weight determined by a subcarrier index or a frequency band index k, $N_t$ denotes a number of transmitting antennas, and R denotes a spatial multiplexing rate. Here, the complex weight can have a different value according to OFDM symbol by which an antenna is multiplied and an index of a corresponding subcarrier. Furthermore, the complex weight can be determined according to at least one of a channel status and a presence or non-presence of feedback information.

Meanwhile, the precoding matrix (P) shown in Formula 1 is preferably designed by a unitary matrix to reduce a loss of a channel size in a multiple antenna system. In this case, to check for a condition for a unitary matrix configuration, a channel size of a multiple antenna open-loop system is represented by Formula 2.

$$C_u(H) = \log_2\left[\det\left(I_{N_r} + \frac{SNR}{N} HH^H\right)\right] \quad \text{[Formula 2]}$$

In Formula 2, H denotes $N_r \times N_t$ multiple antenna channel matrix, and $N_r$ denotes the number of receiving antennas. Formula 3 results from applying the phase-shift-based precoding matrix P to Formula 2.

$$C_{precoding} = \log_2\left[\det\left(I_{N_r} + \frac{SNR}{N}HPP^HH^H\right)\right] \quad \text{[Formula 3]}$$

Since $PP^H$, as shown in Formula 3, can be an identity matrix to avoid a loss of a channel size, the phase-shift-based precoding matrix P can be an identity matrix that meets the following condition.

$$PP^H = I_N \quad \text{[Formula 4]}$$

In order to make the phase-shift-based precoding matrix P become an identity matrix, two (2) conditions (i.e., a power restriction condition and an orthogonality restriction condition) need to be satisfied. The power restriction is to make a size of each column, by which the matrix is configured, become 1. In addition, the orthogonality restriction is to provide an orthogonal characteristic between columns. They can be represented as Formula 5 and Formula 6.

$$|w_{1,2}^k|^2 + |w_{2,1}^k|^2 + \ldots + |w_{N_t,1}^k|^2 = 1 \quad \text{[Formula 5]}$$
$$|w_{1,2}^k|^2 + |w_{2,2}^k|^2 + \ldots + |w_{N_t,2}^k|^2 = 1$$
$$\vdots$$
$$|w_{1,R}^k|^2 + |w_{2,R}^k|^2 + \ldots + |w_{N_t,R}^k|^2 = 1$$

$$w_{1,1}^{k*}w_{1,2}^k + w_{2,1}^{k*}w_{2,2}^k + \ldots + w_{N_t,1}^{k*}w_{N_t,2}^k = 0 \quad \text{[Formula 6]}$$
$$w_{1,1}^{k*}w_{1,3}^k + w_{2,1}^{k*}w_{2,3}^k + \ldots + w_{N_t,1}^{k*}w_{N_t,3}^k = 0$$
$$\vdots$$
$$w_{1,1}^{k*}w_{1,R}^k + w_{2,1}^{k*}w_{2R2}^k + \ldots + w_{N_t,1}^{k*}w_{N_t,R}^k = 0$$

For example, a generalized formula (or equation) having 2×2 phase-shift-based precoding matrix is proposed. Further, there is/are formula(s) associated with satisfying the aforementioned two (2) conditions will be explained.

Formula 7 denotes a generalized expression of phase-shift-based precoding matrix using two transmitting antennas with a spatial multiplexing rate of 2.

$$P_{2\times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix} \quad \text{[Formula 7]}$$

In Formula 7, $\alpha_i$ (where i=1, 2) is a real number, $\beta_j$ (where j=1, 2) is a real number, $\theta_i$ (where i=1, 2, 3, 4) indicates a phase value, and k indicates a subcarrier index of OFDM signal. In order to implement the precoding matrix with an identity matrix, the power restriction condition in Formula 8 and the orthogonality restriction in Formula 9 need to be met.

$$|\alpha_1 e^{jk\theta_1}|^2 + |\beta_2 e^{jk\theta_3}|^2 = 1, \ |\alpha_2 e^{jk\theta_4}|^2 + |\beta_1 e^{jk\theta_2}|^2 = 1 \quad \text{[Formula 8]}$$

$$(\alpha_1 e^{jk\theta_1})^* \beta_1 e^{jk\theta_2} + (\beta_2 e^{jk\theta_3})^* \alpha_2 e^{jk\theta_4} = 0 \quad \text{[Formula 9]}$$

In Formula 9, the mark '*' denotes a conjugate complex number.

Further, an example of a 2×2 phase-shift-based precoding matrix which satisfies Formulas 7 to 9 is shown in Formula 10.

$$P_{2\times 2}^k = \frac{1}{\sqrt{2}}\begin{pmatrix} 1 & e^{jk\theta_2} \\ e^{jk\theta_3} & 1 \end{pmatrix} \quad \text{[Formula 10]}$$

Here, there is a relationship between $\theta_2$ and $\theta_3$ which is represented in Formula 11 according to the orthogonality restriction.

$$k\theta_3 = -k\theta_2 + \pi \quad \text{[Formula 11]}$$

A precoding matrix can be stored as a codebook in a memory of a transmitting or receiving terminal. Moreover, the codebook can be configured to include various precoding matrixes generated from finite number of different $\theta_2$ values. In this case, the $\theta_2$ value can be appropriately set according to a channel status and a presence or non-presence of feedback information. In case of using feedback information, $\theta_2$ is set to a small value. If the feedback information is not used, $\theta_2$ can be set to a large number. With such configuration, high frequency diversity gain can be achieved.

Reconfiguration of Phase-Shift-Based Precoding Matrix

Even if the phase-shift-based precoding matrix, like Formula 7, is generated, a spatial multiplexing rate can be substantially set small compared to actual number of antennas based on channel status (or condition). In this case, a number of specific columns corresponding to a current spatial multiplexing rate (decreased spatial multiplexing rate) are selected from the generated phase-shift-based precoding matrix and a new phase-shift-based precoding matrix can be then reconfigured. In particular, instead of generating a new precoding matrix applied to a corresponding system each time a spatial multiplexing rate varies, an initially generated phase shift based precoding matrix is utilized to reconfigure a precoding matrix by selecting a specific column from the corresponding precoding matrix.

For instance, it is assumed that the precoding matrix shown in Formula 10 has a spatial multiplexing rate of 2 in a multiple antenna system having two transmitting antennas. However, it is possible for the spatial multiplexing rate of the system to be reduced to 1. In this case, the matrix can be reconfigured into a precoding matrix having a spatial multiplexing rate of 1 by selecting a specific column from the matrix shown in Formula 10.

Further, an example of a phase-shift-based precoding matrix configured by selecting a second column is shown in Formula 12. This becomes the same format of the relate art cyclic delay diversity scheme of two transmitting antennas.

$$P_{2\times 2}^k = \frac{1}{\sqrt{2}}\begin{pmatrix} e^{jk\theta_2} \\ 1 \end{pmatrix} \quad \text{[Formula 12]}$$

In Formula 12, a system having two transmitting antennas is taken as an example. This Formula is extended to be applicable to a system having four transmitting antennas. Moreover, precoding can be executed by selecting a specific column according to a spatial multiplexing rate varying after generation of a phase shift based precoding matrix in case of a spatial multiplexing rate of 4.

Figure 8:
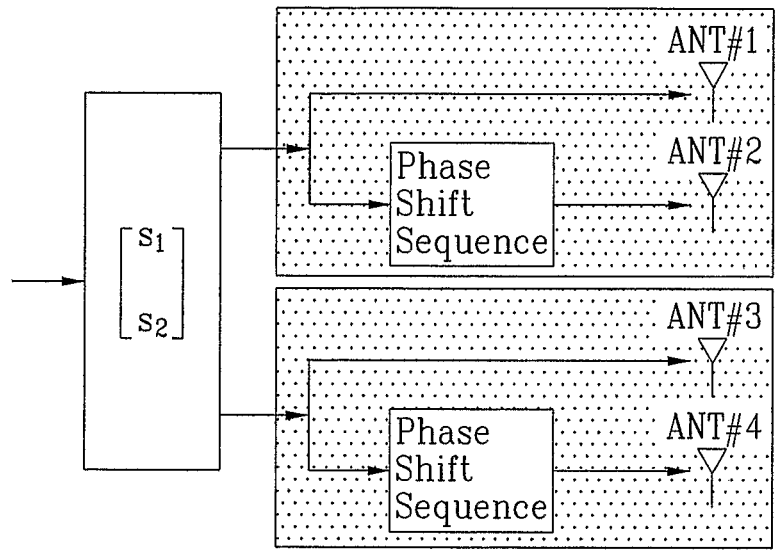
FIG. 8 is a diagram to explain a process for performing phase shift diversity scheme of a related art in a system having four antennas with a spatial multiplexing rate 2.
Figure 9:
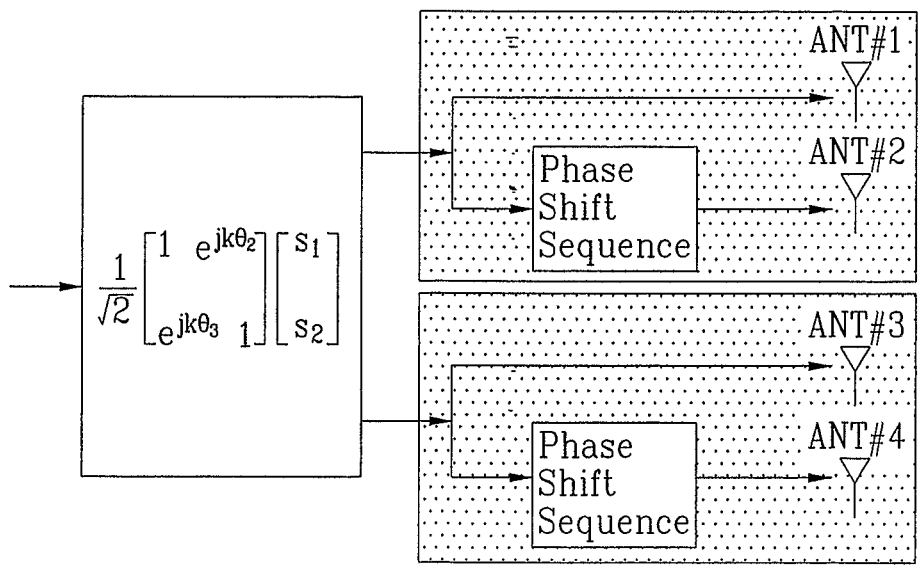
FIG. 9 shows an example of applying the phase-shift based precoding matrix of Formula 10 to the multiple antenna system shown in FIG. 8.

For this, FIG. 8 shows an example of spatial multiplexing and cyclic delay diversity applied to a multiple antenna system having four antennas with a spatial multiplexing rate 2. FIG. 9 shows an example of applying the phase-shift-based precoding matrix of Formula 10 to the multiple antenna system shown in FIG. 8.

Referring to FIG. 8, a first sequence $S_1$ and a second sequence $S_2$ are delivered to a first antenna and a third antenna, respectively. A first phase-shifted sequence $S_1 e^{j\Theta_1}$ having a prescribed size and a second phase-shifted sequence $S_2 e^{j\Theta_1}$ having a prescribed size are delivered to a second antenna and a fourth antenna, respectively. Accordingly, the spatial multiplexing rate becomes 2.

On the contrary, referring to FIG. 9, $S_1 + S_1 e^{j\Theta_2}$ is delivered to a first antenna, $S_1 e^{j\Theta_3} + S_2$ is delivered to a third antenna, $S_1 e^{j\Theta_1} + S_2 e^{j(\Theta_1 + \Theta_2)}$ is delivered to a second antenna, and $S_1 e^{j(\Theta_1 + \Theta_3)} + S_2 e^{j\Theta_1}$ is delivered to a fourth antenna. So, compared to the system shown in FIG. 8, the system shown in FIG. 9 can perform a cyclic delay (or phase shift) on four antennas using a single precoding matrix with the advantages of the precoding scheme. Accordingly, the advantage of the cyclic delay diversity scheme can be gained.

The phase-shift-based precoding matrixes per the spatial multiplexing rate for the above-explained 2- and 4-antenna systems are summarized in Table 2.

TABLE 2

| Spatial multiplexing rate 1 | Spatial multiplexing rate 2 |
|---|---|
| 2-antenna System | |
| $\frac{1}{\sqrt{2}}\begin{bmatrix}1\\e^{j\theta_1 k}\end{bmatrix}$ | $\frac{1}{\sqrt{2}}\begin{bmatrix}1 & -e^{-j\theta_1 k}\\e^{j\theta_1 k} & 1\end{bmatrix}$ |
| 4-antenna System | |
| $\frac{1}{\sqrt{4}}\begin{bmatrix}1\\e^{j\theta_1 k}\\e^{j\theta_2 k}\\e^{j\theta_3 k}\end{bmatrix}$ | $\frac{1}{\sqrt{4}}\begin{bmatrix}1 & -e^{-j\theta_1 k}\\e^{j\theta_1 k} & 1\\e^{j\theta_2 k} & -e^{-j\theta_3 k}\\e^{j\theta_3 k} & e^{-j\theta_2 k}\end{bmatrix}$ |

Figure 10:
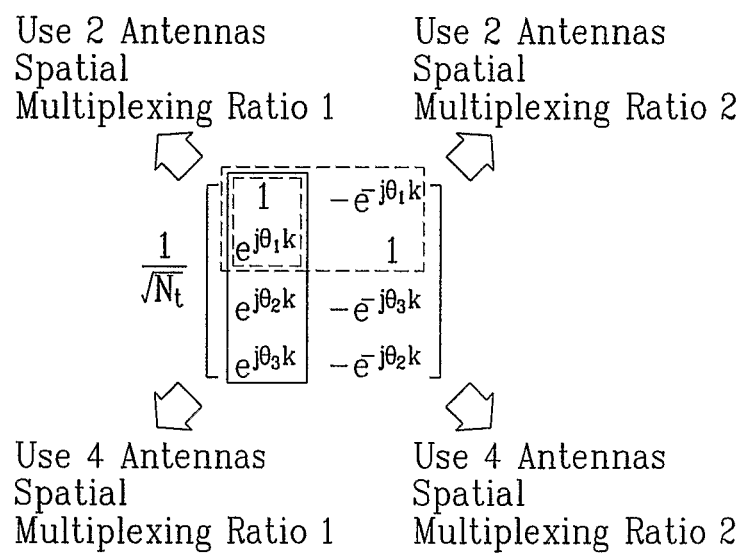
FIG. 10 is an exemplary diagram of precoding matrix used for phase-shift based precoding scheme of the present invention in the system shown in FIG. 9.

In Table 2, $\theta_i$ (i=1, 2, 3) indicates a phase angle according to a cyclic delay value and k denotes a subcarrier index of OFDM. Each precoding matrix of the above four cases can be obtained by taking a specific portion of a precoding matrix, as shown in FIG. 10, for a multiple antenna system having four transmitting antennas with a spatial multiplexing rate 2. FIG. 10 is an exemplary diagram of precoding matrix used for phase-shift-based precoding scheme of the present invention in the system shown in FIG. 9.

Since it is unnecessary for a codebook to be provided with precoding matrixes for the above four cases, it is able to save memory sizes of transmitting and receiving terminals. Moreover, the above-explained phase shift based precoding matrix is extendable to a system having an antenna number M and a spatial multiplexing rate N in the same manner.

Offset Application to Phase Shift Based Precoding Matrix

The descriptions to follow relate to a process for determining an optimized precoding matrix by applying a phase value offset and/or a subcarrier index offset to a phase-shift-based precoding matrix in the system, as shown in Table 2, having the four antennas with the spatial multiplexing rate 2. However, the present invention is not limited to the following embodiments, example, and/or descriptions. Moreover, the descriptions to follow can be applied to a system having M number of antennas with a spatial multiplexing rate N in the same manner.

Offset Application Example 1

Figure 11A:
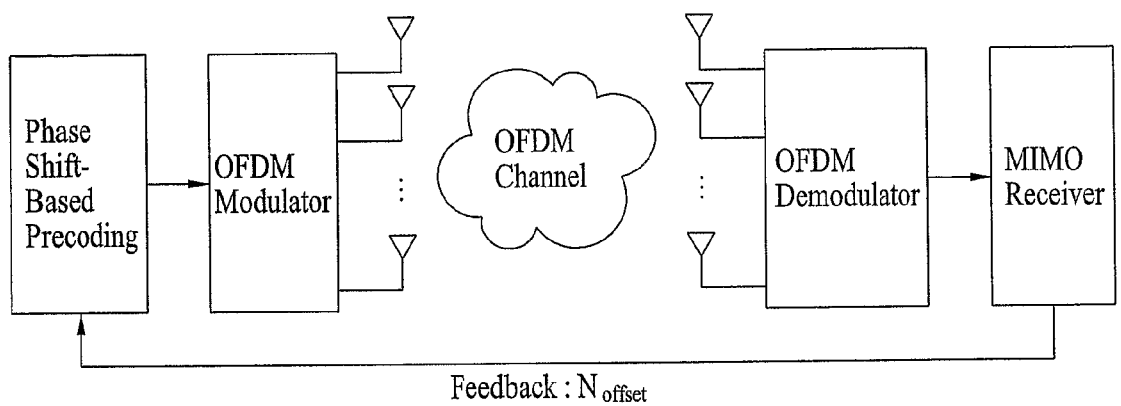
FIG. 11A and FIG. 11B are diagrams to explain concept of phase-shift-based precoding scheme, in which subcarrier index offset is fed back.
Figure 11B:
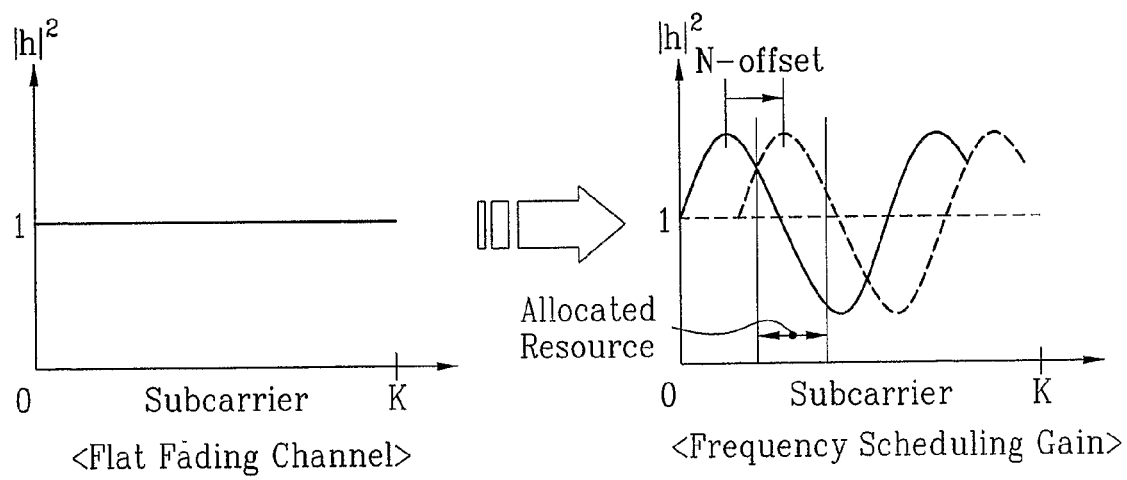

FIG. 11A and FIG. 11B are diagrams to explain concept of phase-shift-based precoding scheme, in which subcarrier index offset is fed back.

A subcarrier index offset $N_{offset}$, as shown in FIG. 11A, is fed back from a receiving terminal and then applied to a phase-shift-based precoding matrix.

Referring to FIG. 11B, a channel area (assigned to a sine wave indicated by a solid line) initially assigned to a subcarrier having an index k is in a status relatively worse than that of another area. Therefore, a receiving terminal obtains a channel status of a resource allocated to a corresponding subcarrier, calculates a suitable offset $N_{offset}$, and then feeds back the offset to a transmitting terminal.

The transmitting terminal applies the fed-back offset $N_{offset}$ to a previous phase-shift-based precoding matrix and then enables the corresponding subcarrier to move into an optimal channel area (assigned to a sine wave indicated by a dotted line). The phase shift based precoding matrix, to which the fed-back index offset $N_{offset}$ is applied, can be represented as Formula 13.

$$\frac{1}{\sqrt{4}}\begin{bmatrix}1 & -e^{-j\theta_1(k+N_{offset})}\\e^{j\theta_1(k+N_{offset})} & 1\\e^{j\theta_2(k+N_{offset})} & -e^{-j\theta_3(k+N_{offset})}\\e^{j\theta_3(k+N_{offset})} & e^{-j\theta_2(k+N_{offset})}\end{bmatrix} \quad \text{[Formula 13]}$$

Offset Application Example 2

Figure 12A:
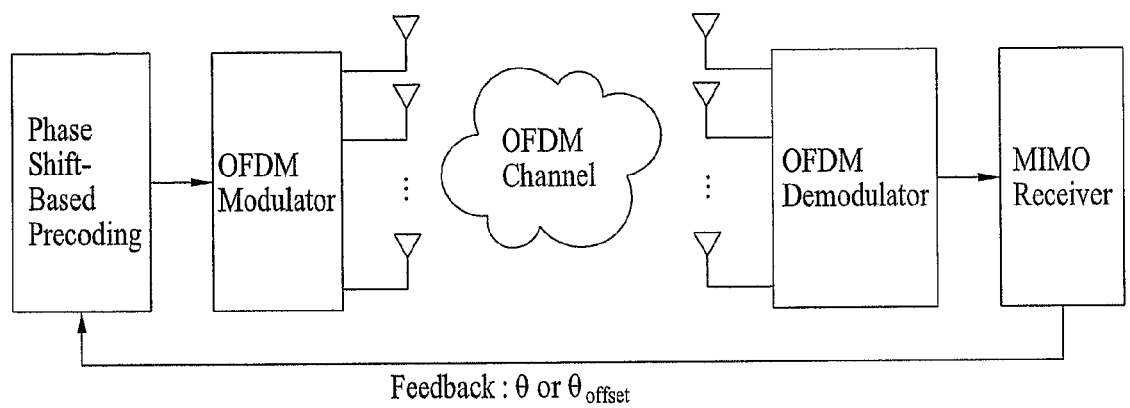
FIG. 12A and FIG. 12B are diagrams to explain concept of phase-shift based precoding scheme, in which phase value offset is fed back.
Figure 12B:
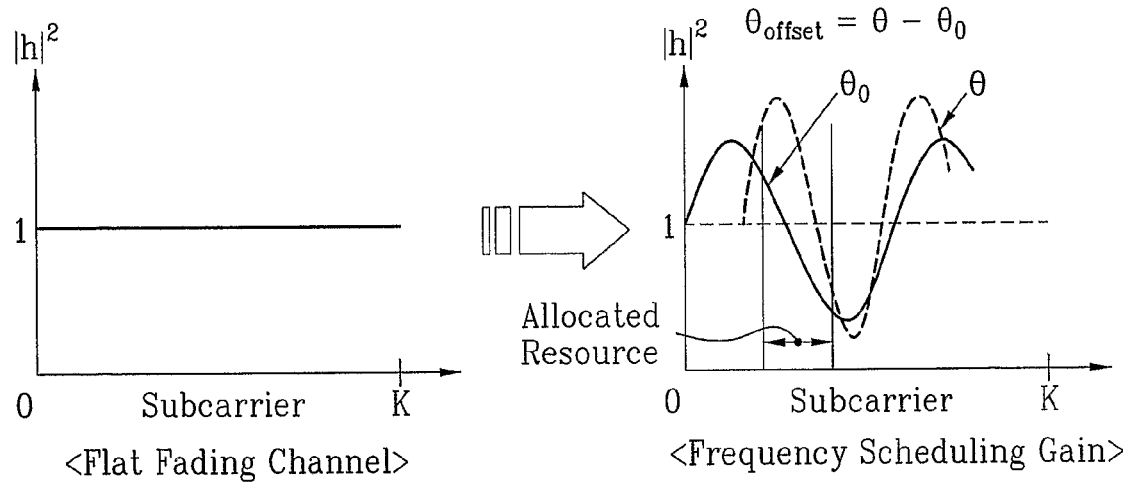

FIG. 12A and FIG. 12B are diagrams to explain concept of phase-shift-based precoding scheme, in which phase value offset is fed back.

Referring to FIG. 12A, a proper phase value $\theta$ is received from a receiving terminal or a phase value offset $\theta_{offset}$ corresponding to a difference between a previously fed-back phase value and an optimized phase value is fed back from the receiving terminal. The received value is then applied to a phase-shift-based precoding matrix.

Referring to FIG. 12B, a channel area (assigned to a sine wave indicated by a solid line) initially assigned to a subcarrier having a phase $\theta_0$ and an index k is in a status relatively worse than that of another area. Therefore, a receiving terminal obtains a channel status of a resource allocated to a corresponding subcarrier, calculates an optimal phase value $\theta$, compares the phase value to a previously fed-back phase value $\theta_0$, and then feeds back the offset $\theta_{offset}$ to a transmitting terminal.

The transmitting terminal applies the fed-back offset $\theta_{offset}$ to a previous phase-shift-based precoding matrix and then enables the corresponding subcarrier to move into an optimal channel area (assigned to a sine wave indicated by a dotted line) in a status relatively better than the previous status. The phase-shift-based precoding matrix, to which the fed-back offset $\theta_{offset}$ is applied, can be represented as Formula 14.

$$\frac{1}{\sqrt{4}}\begin{bmatrix}1 & -e^{-j(\theta_1+\theta_{1,offset})k}\\e^{j(\theta_1+\theta_{1,offset})k} & 1\\e^{j(\theta_2+\theta_{2,offset})k} & -e^{-j(\theta_3+\theta_{3,offset})k}\\e^{j(\theta_3+\theta_{3,offset})k} & e^{-j(\theta_2+\theta_{2,offset})k}\end{bmatrix} \quad \text{[Formula 14]}$$

Meanwhile, the receiving terminal obtains a status of a channel assigned to a corresponding subcarrier and then calculates an optimal phase value $\theta$. If the receiving terminal directly feeds back the value $\theta$ to the transmitting terminal, the transmitting terminal can newly generate a phase-shift based precoding matrix based on the fed-back phase value.

Offset Application Example 3

Figure 13A:
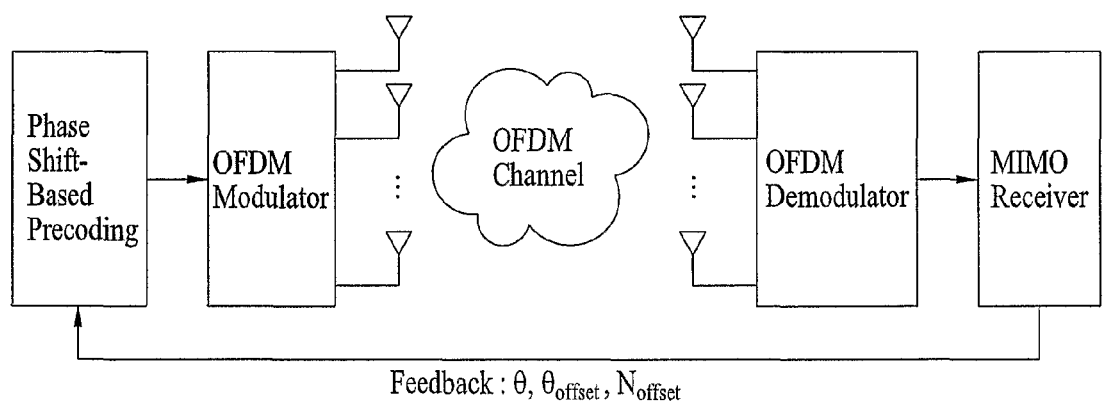
FIG. 13A and FIG. 13B are diagrams to explain concept of phase-shift based precoding scheme, in which subcarrier index offset and phase value offset are fed back.
Figure 13B:
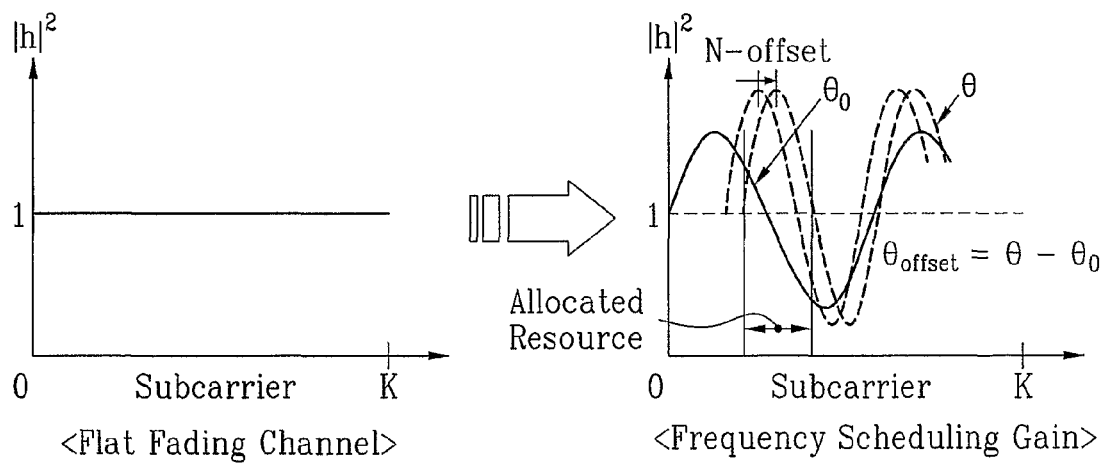

FIG. 13A and FIG. 13B are diagrams to explain concept of phase-shift-based precoding scheme, in which subcarrier index offset and phase value offset are fed back.

Referring to FIG. 13A, a proper phase value θ and a subcarrier index offset $N_{offset}$ are received from a receiving terminal or a phase value offset $\theta_{offset}$ corresponding to a difference between a previously fed-back phase value and an optimized phase value and a subcarrier index offset $N_{offset}$ are fed back from the receiving terminal. The received values are then applied to a phase-shift based precoding matrix.

Referring to FIG. 13B, a channel area (assigned to a sine wave indicated by a solid line) initially assigned to a subcarrier having a phase $\theta_0$ and an index k is in a status relatively worse than that of another area. Therefore, a receiving terminal obtains a channel status of a resource allocated to a corresponding subcarrier, calculates an optimal phase value θ and a subcarrier index offset $N_{offset}$, and then feeds back an offset $\theta_{offset}$ corresponding to a difference between the phase value θ and the previously fed-back phase value $\theta_0$ and the subcarrier index offset $N_{offset}$ to a transmitting terminal.

The transmitting terminal adds the fed-back offsets $\theta_{offset}$ and $N_{offset}$ to a previous phase-shift-based precoding matrix and then enables the corresponding subcarrier to move into an optimal channel area (assigned to a sine wave indicated by a dotted line). The phase-shift-based precoding matrix, to which the fed-back offsets $\theta_{offset}$ and $N_{offset}$ are applied, can be represented as Formula 15.

$$\frac{1}{\sqrt{4}}\begin{bmatrix} 1 & -e^{-j(\theta_1+\theta_{1,offset})(k+N_{offset})} \\ e^{j(\theta_1+\theta_{1,offset})(k+N_{offset})} & 1 \\ e^{j(\theta_2+\theta_{2,offset})(k+N_{offset})} & -e^{-j(\theta_3+\theta_{31,offset})(k+N_{offset})} \\ e^{j(\theta_3+\theta_{3,offset})(k+N_{offset})} & e^{-j(\theta_2+\theta_{2,offset})(k+N_{offset})} \end{bmatrix}$$ [Formula 15]

Offset Application Example 4

A subcarrier index of a phase-shift-based precoding matrix is fixed to a subcarrier index offset $N_{offset}$ fed back from a receiving terminal to be used.

The receiving terminal obtains a channel status of resources allocated to an arbitrary or prescribed subcarrier, computes a proper offset $N_{offset}$, and then feeds back the calculated offset to a transmitting terminal.

The transmitting terminal having received the fed-back offset applies the fed-back offset $N_{offset}$ to a previous phase shift based precoding matrix for all subcarriers regardless of a subcarrier type (or subcarrier index) and then enables the entire subcarriers to move into an optimal channel area (assigned to a sine wave indicated by a dotted line).

In this case, since a frequency domain having a largest channel size is identically applied to the entire subcarriers, system performance can be further enhanced. The phase-shift-based precoding matrix having the fed-back index offset $N_{offset}$ applied thereto can be represented as Formula 16.

$$\frac{1}{\sqrt{4}}\begin{bmatrix} 1 & -e^{-j\theta_1 N_{offset}} \\ e^{j\theta_1 N_{offset}} & 1 \\ e^{j\theta_2 N_{offset}} & -e^{-j\theta_3 N_{offset}} \\ e^{j\theta_3 N_{offset}} & e^{-j\theta_2 N_{offset}} \end{bmatrix}$$ [Formula 16]

Here, the subcarrier index offset $N_{offset}$ is a fixed value and becomes information for making a largest channel size in the receiving terminal.

Precoder for Implementing Phase Shift Based Precoding

The precoding matrix determination module 641/741 reads a precoding matrix previously stored in the memory 150 or selects to read a specific precoding matrix from a codebook and then determines a column corresponding to a specific subcarrier in the corresponding precoding matrix as a reference column. Subsequently, the reference column is phase-shifted by a predetermined unit to decide other columns corresponding to the reset of the subcarriers.

Assuming that the subcarrier corresponding to the reference column is a subcarrier of an index 1, a column corresponding to a subcarrier of an index 2 can be decided by phase-shifting the reference column by a predetermined size. Moreover, a column corresponding to a subcarrier of an index 3 can be decided by phase-shifting the phase-shifted column again by a predetermined size. This phase shift process is repeated up to a last column.

In this case, the size of the phase shift can be variously set (or configured) according to a current channel status (or condition) measured by the transmitter and/or can be varied according to information fed back from the receiving terminal.

The matrix reconfiguring module 642/742 reconfigures a precoding matrix in a manner of selecting columns amounting to the number corresponding to a spatial multiplexing rate given by each precoding matrix decided by the precoding matrix deciding module 641/741 and then deleting the rest of the columns. In this case, a precoding matrix constructed with the selected columns only can be newly generated. Meanwhile, selecting the specific column from the precoding matrix can be selecting a random column or selecting a specific column according to a predetermined rule.

The offset applying module 643/743 completes a final precoding matrix by applying phase value information and/or subcarrier index offset information fed back from the receiving terminal to the reconfigured precoding matrix.

The precoding module 644/744 executes precoding by inserting OFDM symbol for a corresponding subcarrier in the decided precoding matrix.

Generalized Phase Shift Based Precoding

In the above description, the process for configuring the phase-shift-based precoding matrix in case of four transmitting antennas and a spatial multiplexing rate 2 is explained. However, a phase-shift-based precoding method can be generalized by Formula 17 for a system having the antenna number $N_t$ ($N_t$ is a natural number over 2) and a spatial multiplexing rate R (R is a natural number over 1).

$$P^k_{N_t \times R} = \begin{bmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_{N_t} k} \end{bmatrix} U_{N_t \times R}$$ [Formula 17]

In Formula 17, a front matrix (hereinafter named 'first matrix') at a right side of the equation mark (=) is a diagonal matrix for phase shift. A rear matrix U (hereinafter named 'second matrix') is a matrix used to make the first matrix into a unitary matrix and satifies $U_{N_t \times R}^H \times U_{N_t \times R} = I_{R \times R}$.

An example of a phase-shift-based precoding matrix in case of using 1-bit codebook with two transmitting antennas is represented by Formula 18.

$$P^k_{2 \times 2} = \begin{bmatrix} \alpha & \beta \\ \beta & -\alpha \end{bmatrix}, \alpha^2 + \beta^2 = 1$$ [Formula 18]

In Formula 18, if a value of α is acquired, a value of β is easily determined. Therefore, information for the α value is set to two kinds of proper values, and its information is fed back as a codebook index. For instance, if a feedback index is 0, α is set to 0.2. If a feedback index is 1, α is set to 0.8. This can be previously agreed between the transmitting and receiving terminals.

As an example of the second matrix, a prescribed precoding matrix for obtaining a signal to noise ratio (SNR) can be used. In particular, in case that Walsh code is used as the precoding matrix, a phase-shift-based precoding matrix P is represented as Formula 19.

$$P_{4\times4}^k = \frac{1}{\sqrt{4}}\begin{bmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{bmatrix}\begin{bmatrix} 1 & 1 & 1 & 1 \\ 1 & -1 & 1 & 1 \\ 1 & 1 & -1 & 1 \\ 1 & -1 & -1 & 1 \end{bmatrix} \quad \text{[Formula 19]}$$

Formula 19 assumes a system having four transmitting antennas and a spatial multiplexing rate 4. By reconfiguring the second matrix appropriately, a specific transmitting antenna (antenna selection) or a spatial multiplexing rate can be tuned (rate tuning).

Formula 20 represents the reconfigured second matrix to select two antennas in a system having four transmitting antennas.

$$P_{4\times4}^k = \frac{1}{\sqrt{4}}\begin{bmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{bmatrix}\begin{bmatrix} 0 & 0 & 1 & 1 \\ 0 & 0 & 1 & -1 \\ 1 & 1 & 0 & 0 \\ 1 & -1 & 0 & 0 \end{bmatrix} \quad \text{[Formula 20]}$$

In case that a spatial multiplexing rate varies according to a time or channel situation, Table 3 shows a method of reconfiguring the second matrix in correspondence to the corresponding spatial multiplexing rate.

TABLE 3

$$P_{4\times4}^k = \frac{1}{\sqrt{4}}\begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix}\begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

multiplexing rate 1 — first column; multiplexing rate 4 — all four columns; multiplexing rate 2 — second and third columns.

In this case, Table 3 shows a case that a first column, first and second columns, and first to fourth columns are selected, which does not put limitation on the implementation of the present invention. For instance, in case that a multiplexing rate is 1, one of the first to fourth columns can be selected. In case that a multiplexing rate is 2, one of first and second columns, second and third columns, third and fourth columns, and fourth to first columns can be selected.

Meanwhile, the second matrix can be provided as a codebook to each of the transmitting and receiving terminals. In this case, index information for the codebook is fed back to the transmitting terminal from the receiving terminal. The transmitting terminal selects a unitary matrix (rear matrix) of a corresponding index from its codebook and then configures a phase-shift-based precoding matrix using Formula 17.

Moreover, the second matrix can be periodically modified to enable the carrier(s) transmitted for the same timeslot to have a different precoding matrix per frequency band.

Hence, a periodically modified precoding matrix can be applied to a frequency band.

Meanwhile, a cyclic delay value for a phase-shift-based precoding can be a value previously set for a transmitter/receiver or a value delivered to the transmitter by the receiver via feedback. Moreover, a spatial multiplexing rate R can be a value previously set for a transmitter/receiver as well.

Alternatively, the receiver obtains a channel status periodically, calculates a spatial multiplexing rate, and then feeds back the calculated value to the transmitter. Alternatively, the transmitter can calculate and modify a spatial multiplexing rate using channel information fed back by the receiver.

Offset Application to Generalized Phase-Shift-Based Precoding Matrix

Process(es) for determining an optimized precoding matrix by applying a phase value offset and/or a subcarrier index offset to a generalized phase-shift-based precoding matrix shown in Formula 17 are explained as follows.

Offset Application Example 5

Similar to the offset application example 1, a subcarrier index offset $N_{offset}$ is fed back from a receiving terminal and then applied to a generalized phase-shift based precoding matrix. As another example, $N_{offset}$ is predefined value which is applied when the retransmission is activated due to packet error.

The generalized phase-shift-based precoding matrix having the fed-back index offset $N_{offset}$ applied thereto can be represented as Formula 21.

$$\begin{bmatrix} e^{j\theta_1(k+N_{offset})} & 0 & \cdots & 0 \\ 0 & e^{j\theta_2(k+N_{offset})} & \cdots & 0 \\ \vdots & \vdots & \ddots & \vdots \\ 0 & 0 & \cdots & e^{j\theta_{N_1}(k+N_{offset})} \end{bmatrix}(U_{N_t\times R}) \quad \text{[Formula 21]}$$

Offset Application Example 6

Similar to offset application example 2, a proper phase value θ is received from a receiving terminal or a phase value offset $\theta_{offset}$ corresponding to a difference between a previously fed-back phase value and an optimized phase value is fed back from the receiving terminal. The received value is then applied to a phase-shift-based precoding matrix. As another example, $\theta_{offset}$ is predefined value which is applied when the retransmission is activated due to packet error.

The phase shift based precoding matrix having the fed-back offset $\theta_{offset}$ applied thereto can be represented as Formula 22.

$$\begin{bmatrix} e^{j(\theta_1+\theta_{1,offset})k} & 0 & \cdots & 0 \\ 0 & e^{j(\theta_2+\theta_{2,offset})k} & \cdots & 0 \\ \vdots & \vdots & \ddots & \vdots \\ 0 & 0 & \cdots & e^{j(\theta_{N_t}+\theta_{N_t,offset})k} \end{bmatrix}(U_{N_t\times R}) \quad \text{[Formula 22]}$$

Meanwhile, the receiving terminal obtains a status of a channel assigned to a corresponding subcarrier, calculates an optimal phase value θ, and then feeds back the calculated value to the transmitting terminal directly. With that, the transmitting terminal can generate a new phase-shift-based precoding matrix based on the fed-back phase value. As another example, $\theta_{N,offset}$ is predefined value which is applied when the retransmission is activated due to packet error.

Offset Application Example 7

Similar to the offset application example 3, a proper phase value θ and a subcarrier index offset $N_{offset}$ are fed back from a receiving terminal or a phase value $θ_{offset}$ corresponding to a difference between a previously fed-back phase value and an optimized phase value and a subcarrier index offset $N_{offset}$ are fed back from the receiving terminal. The received values are then applied to a phase-shift-based precoding matrix. As another example, $θ_{offset}$ and $N_{offset}$ are predefined value which are applied when the retransmission is activated due to packet error.

The phase-shift-based precoding matrix having the feed-back offsets $θ_{offset}$ and $N_{offset}$ applied thereto can be represented as Formula 23.

$$\begin{bmatrix} e^{j(θ_1+θ_{1,offset})(k+N_{offset})} & 0 & \cdots & 0 \\ 0 & e^{j(θ_2+θ_{2,offset})(k+N_{offset})} & \cdots & 0 \\ \vdots & \vdots & \ddots & \vdots \\ 0 & 0 & \cdots & e^{j(θ_{N_t}+θ_{N_t,offset})(k+N_{offset})} \end{bmatrix} (U_{N_t \times R})$$

[Formula 23]

Offset Application Example 8

Similar to the offset application example 4, a subcarrier index of a phase-shift-based precoding matrix is fixed to a subcarrier index offset $N_{offset}$ fed back from a receiving terminal to be used.

A generalized phase-shift-based precoding matrix having the fed-back index offset $N_{offset}$ applied thereto can be represented as Formula 24.

$$\begin{bmatrix} e^{jθ_1 N_{offset}} & 0 & \cdots & 0 \\ 0 & e^{jθ_2 N_{offset}} & \cdots & 0 \\ \vdots & \vdots & \ddots & \vdots \\ 0 & 0 & \cdots & e^{jθ_{N_t} N_{offset}} \end{bmatrix} (U_{N_t \times R})$$

[Formula 24]

In this case, the subcarrier index offset $N_{offset}$ is a fixed value in a predetermined frequency band interval for OFDM symbol and becomes information for making a largest channel size in the receiving terminal.

Precoder for Implementing Generalized Phase Shift Based Precoding

Figure 14:
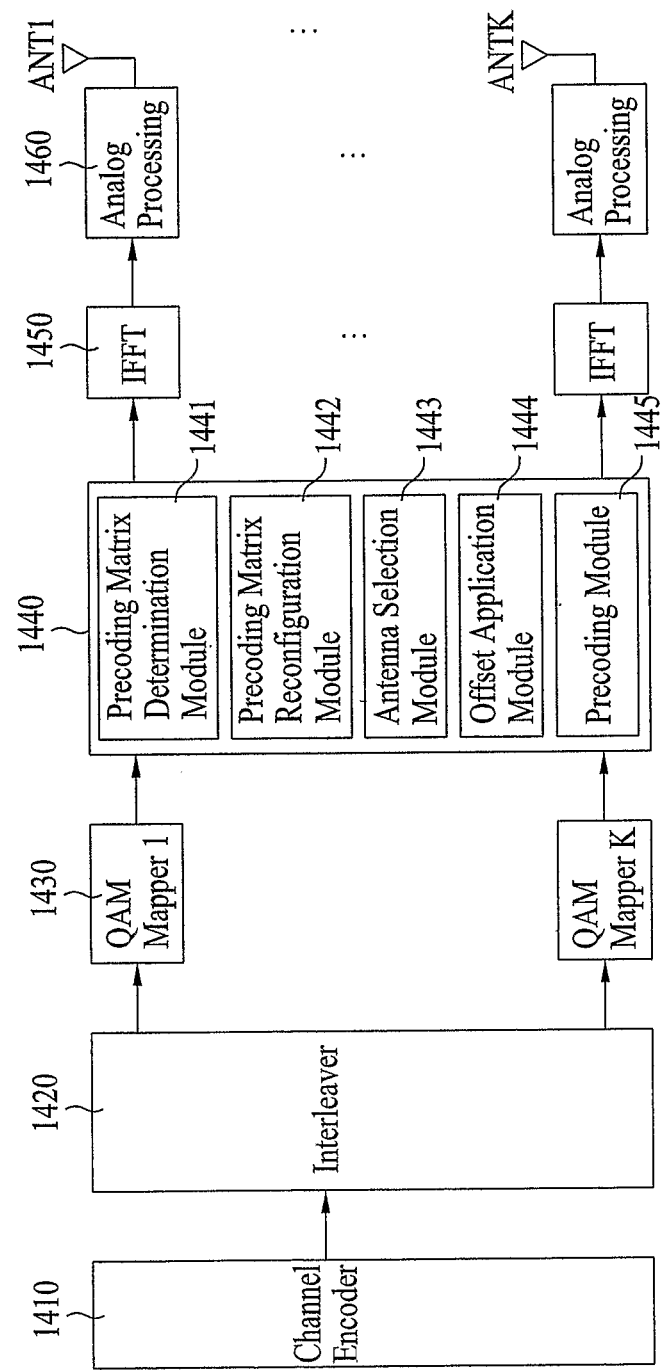
FIG. 14 is an exemplary block diagram illustrating SCW OFDM transmitter having generalized phase-shift-based precoding scheme applied thereto.
Figure 15:
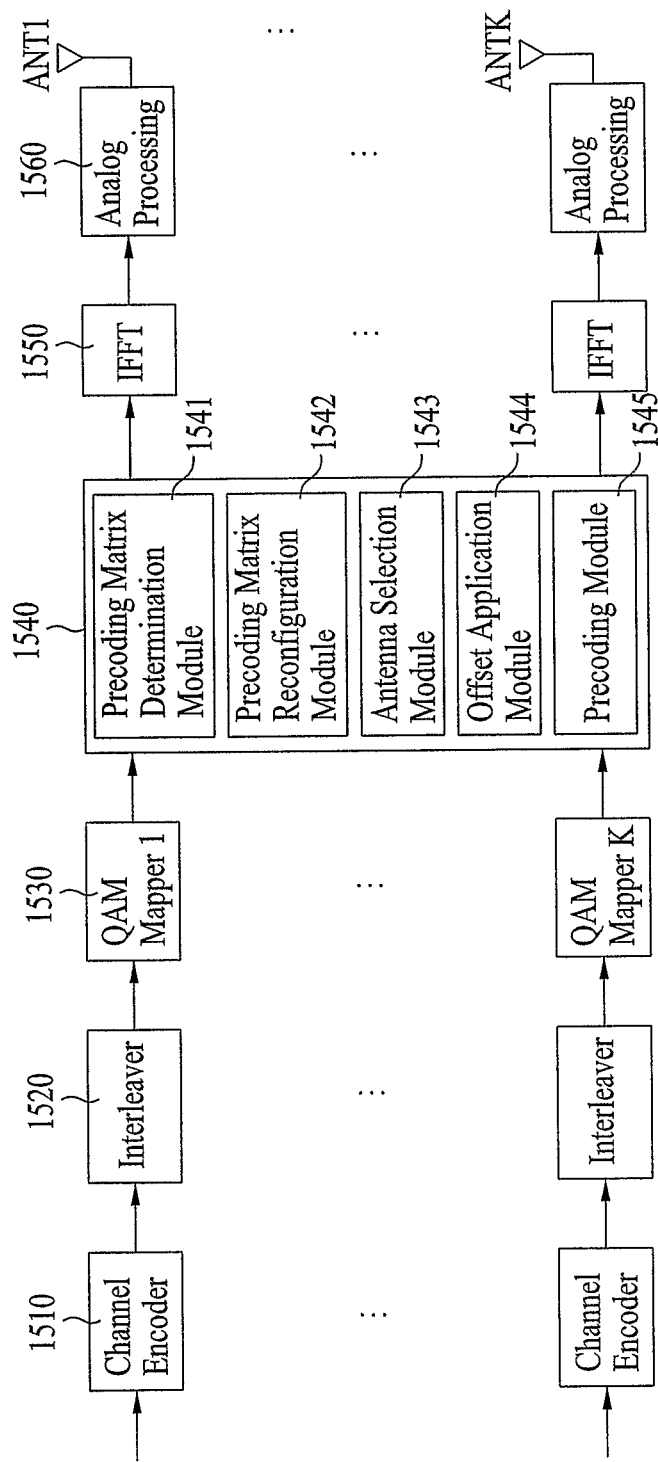
FIG. 15 is an exemplary block diagram illustrating MCW OFDM transmitter having generalized phase-shift based precoding scheme applied thereto.

FIG. 14 is an exemplary block diagram illustrating SCW OFDM transmitter having generalized phase-shift-based precoding scheme applied thereto. FIG. 15 is an exemplary block diagram illustrating MCW OFDM transmitter having generalized phase-shift-based precoding scheme applied thereto.

Referring to FIG. 14 and FIG. 15, a precoder 1440/1540 includes a precoding matrix deciding module 1441/1541, an offset applying module 1444/1544, and a precoding module 1445/1545. The precoder 1440/1540 can further include a matrix reconfiguring module 1442/1542 and/or an antenna selecting module 1443/1543.

The precoding matrix deciding module 1441/1541 decides a phase-shift-based precoding matrix, as shown in Formula 17, by multiplying a first matrix as a diagonal matrix for phase shift by a second matrix meeting a unitary matrix condition.

The matrix reconfiguring module 1442/1542 selects columns amounting to the number corresponding to a prescribed spatial multiplexing rate from the second matrix, as shown in Table 3, and then reconfigures the second matrix including the selected columns only.

Assuming that the second matrix is N×N matrix (N is an integer greater than 2), the antenna selecting module 1443/1453 selects at least one of n×n partial matrix corresponding to a specific antenna from the second matrix and then selects a specific antenna to be used for data transmission by setting all components except the selected partial matrix to 0.

The precoding module 1445/1545 performs precoding operation by inserting OFDM symbol for a corresponding subcarrier in each of the determined precoding matrixes.

In order to implement the transmitting apparatus, a memory (not shown in the drawing) for storing various kinds of setting information therein, a receiving circuit (not shown in the drawing) for receiving feedback information, and a controller (not shown in the drawing) for overall control of the aforesaid elements can be provided.

In particular, a codebook for phase shift based precoding and an MCS lookup table for supporting adaptive channel coding & modulation (AMC) can be stored in the memory. In this case, the codebook includes at least one phase-shift-based precoding matrix item and at least one index item for each matrix. Moreover, the MCS lookup table includes at least one coding rate item to be applied to inputted information bits, at least one modulation scheme item, and at least one MCS level index item matched to the items.

The receiving circuit receives a signal transmitted from a receiver via an antenna, digitalizes the received signal, and then sends the digitalized signal to the controller. Information extracted from the signal received by the receiving circuit can include channel quality information (CQI). In this case, the CQI is the information fed back to the transmitter 100 by the receiver for a channel environment, a coding scheme, and modulation scheme. In particular, at least one of index information for a phase shift based precoding matrix and index information for specifying a specific coding rate and/or modulation scheme or modulation size. Furthermore, MCS (modulation and coding scheme) level index can be used as the index information.

INDUSTRIAL APPLICABILITY

Accordingly, the present invention provides the following effects and/or advantages.

First of all, the present invention provides the advantages of the related art phase shift diversity scheme and the related art precoding scheme.

Secondly, the present invention adaptively copes with a channel status or a system status without being affected by an antenna structure and a spatial multiplexing rate, thereby performing efficient data transmission.

Thirdly, the present invention additionally applies a phase value offset and/or subcarrier index offset information fed back from a receiving terminal to a precoding matrix for the application of the phase shift based precoding scheme, thereby performing communication in an optimal channel environment.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for transmitting data using phase-shift-based precoding in a multiple antenna system, the method comprising:
   receiving feedback information including a subcarrier index offset and a phase value offset, wherein the phase value offset corresponds to a difference between a previously fed-back phase value and an optimized phase value and the subcarrier index offset indicates a subcarrier where a channel status is better than a channel status of a previous subcarrier;
   determining a diagonal matrix as a part of a phase-shift-based precoding matrix, wherein the diagonal matrix is determined by applying the subcarrier index offset and the phase value offset;
   selecting a first unitary matrix from a codebook as a part of the phase-shift-based precoding matrix;
   performing precoding using the phase-shift-based precoding matrix to symbols associated with the subcarrier indicated by the subcarrier index offset; and
   transmitting the precoded symbols,
   wherein the codebook comprises the first unitary matrix corresponding to a first spatial multiplexing rate and a second unitary matrix corresponding to a second spatial multiplexing rate, and
   wherein the second unitary matrix includes all columns of the first unitary matrix as a part of columns of the second unitary matrix when the second spatial multiplexing rate is higher than the first spatial multiplexing rate.

2. The method of claim 1, wherein the first unitary matrix is used for selecting one or more specific antennas.

3. The method of claim 1, wherein the phase-shift-based precoding matrix is expressed as:

$$\begin{bmatrix} e^{j(\theta_1+\theta_{1,offset})(k+N_{offset})} & 0 & \cdots & 0 \\ 0 & e^{j(\theta_2+\theta_{2,offset})(k+N_{offset})} & \cdots & 0 \\ \vdots & \vdots & \ddots & \vdots \\ 0 & 0 & \cdots & e^{j(\theta_{N_t}+\theta_{N_t,offset})(k+N_{offset})} \end{bmatrix} (U_{N_t \times R})$$

where $\theta_i$ ($0 \leq i \leq N$) represents a phase shift value, $N_t$ represents a number of multiple antennas, k represents a subcarrier index, $\theta_{i,offset}$ represents the phase value offset, $N_{offset}$ represents the subcarrier index offset, $U_{Nt \times R}$ is the first unitray matrix, and R represents a spatial multiplexing rate.

4. The method of claim 1, wherein the phase-shift-based precoding matrix is expressed as:

$$\frac{1}{\sqrt{4}} \begin{bmatrix} 1 & -e^{-j(\theta_1+\theta_{1,offset})(k+N_{offset})} \\ e^{j(\theta_1+\theta_{1,offset})(k+N_{offset})} & 1 \\ e^{j(\theta_2+\theta_{2,offset})(k+N_{offset})} & -e^{-j(\theta_3+\theta_{31,offset})(k+N_{offset})} \\ e^{j(\theta_3+\theta_{3,offset})(k+N_{offset})} & e^{-j(\theta_2+\theta_{2,offset})(k+N_{offset})} \end{bmatrix},$$

where $\theta_i$ ($0 \leq i \leq 3$) represents a phase shift value corresponding to each of multiple antennas, k represents a subcarrier index, $\theta_{i,offset}$ represents the phase value offset, and $N_{offset}$ represents the subcarrier index offset.

5. The method of claim 1, wherein the phase-shift-based precoding matrix (P) is expressed as $$P^k_{N_t \times R} = \begin{bmatrix} w^k_{1,1} & w^k_{1,2} & \cdots & w^k_{1,R} \\ w^k_{2,1} & w^k_{2,1} & \cdots & w^k_{2,1} \\ \vdots & \vdots & \ddots & \vdots \\ w^k_{N_t,1} & w^k_{N_t,2} & \cdots & w^k_{N_t,R} \end{bmatrix},$$

where $w_{i,j}^k$ (i=1, ..., $N_t$, j=1, ..., R) indicates a complex weight determined by a subcarrier index or a frequency band index k, $N_t$ indicates a number of multiple antennas, and R indicates a spatial multiplexing rate.

6. An apparatus for transmitting data using phase-shift-based precoding in a multiple antenna system, the apparatus comprising:
   a receiver configured to receive feedback information including a subcarrier index offset and a phase value offset;
   a precoding matrix determination module configured to:
      determine a diagonal matrix as a part of a phase-shift-based precoding matrix; and
      select a first unitary matrix from a codebook as a part of the phase-shift-based precoding matrix;
   a precoding module configured to perform precoding using the phase-shift-based precoding matrix to symbols associated with a subcarrier indicated by the subcarrier index offset; and
   a transmitter configured to transmit the precoded symbols,
   wherein:
      the phase value offset corresponds to a difference between a previously fed-back phase value and an optimized phase value and the subcarrier index offset indicates the subcarrier where a channel status is better than a channel status of a previous subcarrier;
      the diagonal matrix is determined by applying the subcarrier index offset and the phase value offset;
      the codebook comprises the first unitary matrix corresponding to a first spatial multiplexing rate and a second unitary matrix corresponding to a second spatial multiplexing rate; and
      the second unitary matrix includes all columns of the first unitary matrix as a part of columns of the second unitary matrix when the second spatial multiplexing rate is higher than the first spatial multiplexing rate.

7. The apparatus of claim 6, wherein the first unitary matrix is used for selecting one or more specific antennas.

8. The apparatus of claim 6, wherein the phase-shift-based precoding matrix is expressed as:

$$\begin{bmatrix} e^{j(\theta_1+\theta_{1,offset})(k+N_{offset})} & 0 & \cdots & 0 \\ 0 & e^{j(\theta_2+\theta_{2,offset})(k+N_{offset})} & \cdots & 0 \\ \vdots & \vdots & \ddots & \vdots \\ 0 & 0 & \cdots & e^{j(\theta_{N_t}+\theta_{N_t,offset})(k+N_{offset})} \end{bmatrix} (U_{N_t \times R})$$

where $\theta_i$ ($0 \leq i \leq N$) represents a phase shift value, $N_t$ represents a number of multiple antennas, k represents a subcarrier index, $\theta_{i,offset}$ represents the phase value offset, $N_{offset}$ represents the subcarrier index offset, $U_{Nt \times R}$ is the first unitray matrix, and R represents a spatial multiplexing rate.

9. The apparatus of claim 6, wherein the phase-shift-based precoding matrix is expressed as:

$$\frac{1}{\sqrt{4}} \begin{bmatrix} 1 & -e^{-j(\theta_1+\theta_{1,offset})(k+N_{offset})} \\ e^{j(\theta_1+\theta_{1,offset})(k+N_{offset})} & 1 \\ e^{j(\theta_2+\theta_{2,offset})(k+N_{offset})} & -e^{-j(\theta_3+\theta_{31,offset})(k+N_{offset})} \\ e^{j(\theta_3+\theta_{3,offset})(k+N_{offset})} & -e^{-j(\theta_2+\theta_{2,offset})(k+N_{offset})} \end{bmatrix},$$

where $\theta_i$ ($0 \leq i \leq 3$) represents a phase shift value corresponding to each of multiple antennas, k represents a subcarrier index, $\theta_{i,offset}$ represents the phase value offset, and $N_{offset}$ represents the subcarrier index offset.

10. The apparatus of claim 6, wherein the phase shift based precoding matrix (P) is expressed as $$P^k_{N_t \times R} = \begin{bmatrix} w^k_{1,1} & w^k_{1,2} & \cdots & w^k_{1,R} \\ w^k_{2,1} & w^k_{2,1} & \cdots & w^k_{2,1} \\ \vdots & \vdots & \ddots & \vdots \\ w^k_{N_t,1} & w^k_{N_t,2} & \cdots & w^k_{N_t,R} \end{bmatrix},$$

where $w_{i,j}^k$ (i=1, ..., $N_t$, j=1, ..., R) indicates a complex weight determined by a subcarrier index or a frequency band index k, $N_t$ indicates a number of multiple antennas, and R indicates a spatial multiplexing rate.

* * * * *